(12) United States Patent
Turnbull

(10) Patent No.: US 6,431,712 B1
(45) Date of Patent: Aug. 13, 2002

(54) AUTOMOTIVE REARVIEW MIRROR ASSEMBLY INCLUDING A HELICAL ANTENNA WITH A NON-CIRCULAR CROSS-SECTION

(75) Inventor: Robert R. Turnbull, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/916,475

(22) Filed: Jul. 27, 2001

(51) Int. Cl.[7] ................................................. G02B 5/08
(52) U.S. Cl. ........................ 359/604; 359/601; 359/602; 359/265; 359/266
(58) Field of Search .................. 359/604, 601, 359/602, 265, 266, 838, 850, 871, 872, 877; 343/895, 702, 700 MS, 725, 715, 713

(56) References Cited

U.S. PATENT DOCUMENTS

| 5,668,559 | A | * | 9/1997 | Baro ........................... 343/702 |
| 5,668,565 | A | * | 9/1997 | Robinson ..................... 343/895 |
| 5,754,146 | A | * | 5/1998 | Knowles et al. ............. 343/895 |
| 5,971,552 | A | | 10/1999 | O'Farrell et al. |
| 6,019,475 | A | | 2/2000 | Lynam et al. |
| 6,172,646 | B1 | * | 1/2001 | Kawahata et al. ........... 343/702 |
| 6,229,492 | B1 | | 5/2001 | Lee et al. |
| 6,331,838 | B1 | * | 12/2001 | Scott et al. .................. 343/715 |

* cited by examiner

Primary Examiner—Mohammad Sikder
(74) Attorney, Agent, or Firm—Price, Heneveld, Cooper, DeWitt & Litton

(57) ABSTRACT

An automotive mirror includes a mirror element, a housing for accepting and retaining the mirror element and a receiver circuit mounted on a printed circuit board (PCB) contained within the housing. The receiver circuit includes a helical antenna with a substantially noncircular cross-section.

29 Claims, 5 Drawing Sheets

AUTOMOTIVE REARVIEW MIRROR ASSEMBLY INCLUDING A HELICAL ANTENNA WITH A NON-CIRCULAR CROSS-SECTION

BACKGROUND OF THE INVENTION

The present invention is directed to an automotive rearview mirror and, more specifically, to an automotive rearview mirror assembly that includes a helical antenna with a non-circular cross-section.

Various manufacturers of automotive rearview mirror assemblies, incorporating electrochromic (EC) mirror elements, have provided various receivers and antennas for those receivers within a housing of the mirror assembly. In general, loop, open wire and helical antennas with circular cross-sections have been implemented in automotive mirror assemblies incorporating EC mirror elements. Unfortunately, round helical antennas that are small enough to fit between a receiver printer circuit board (PCB) and a rear surface of an EC mirror element have generally been too small to provide adequate gain for many applications (e.g., tire pressure monitoring).

Further, loop antennas that are small enough to be useful in such applications generally have a high Q-factor, which makes them difficult to tune in a production environment and, in general, small loop antennas tend to have less gain than small helical antennas with a circular cross-section. Additionally, loop antennas experience transmission nulls when utilized in combination with receivers that receive signals from transmitters that rotate, e.g., tire transmitters. In general, the impedance of all antenna types are affected by EC mirror elements, which contain two or more highly conductive layers, when a given antenna is placed in close proximity to the EC mirror element.

What is needed is an antenna that is effective for receiving signals from transmitters that are rotating when the antenna is incorporated within an automotive mirror assembly that includes an electrochromic mirror element.

SUMMARY OF THE INVENTION

An embodiment of the present invention is directed to an automotive rearview mirror assembly that includes a mirror element, a housing for accepting and retaining the mirror element and a receiver circuit mounted on a printed circuit board (PCB) contained within the housing. The receiver circuit includes a helical antenna with a substantially non-circular cross-section, e.g., substantially one of a rectangular, an oval and an elliptical cross-section.

These and other features, advantages and objects of the present invention will be further understood and appreciated by those skilled in the art by reference to the following specification, claims, and appended drawings.

DETAILED DESCRIPTION OF PREFERRED EMBODIMENT

Figure 1A:
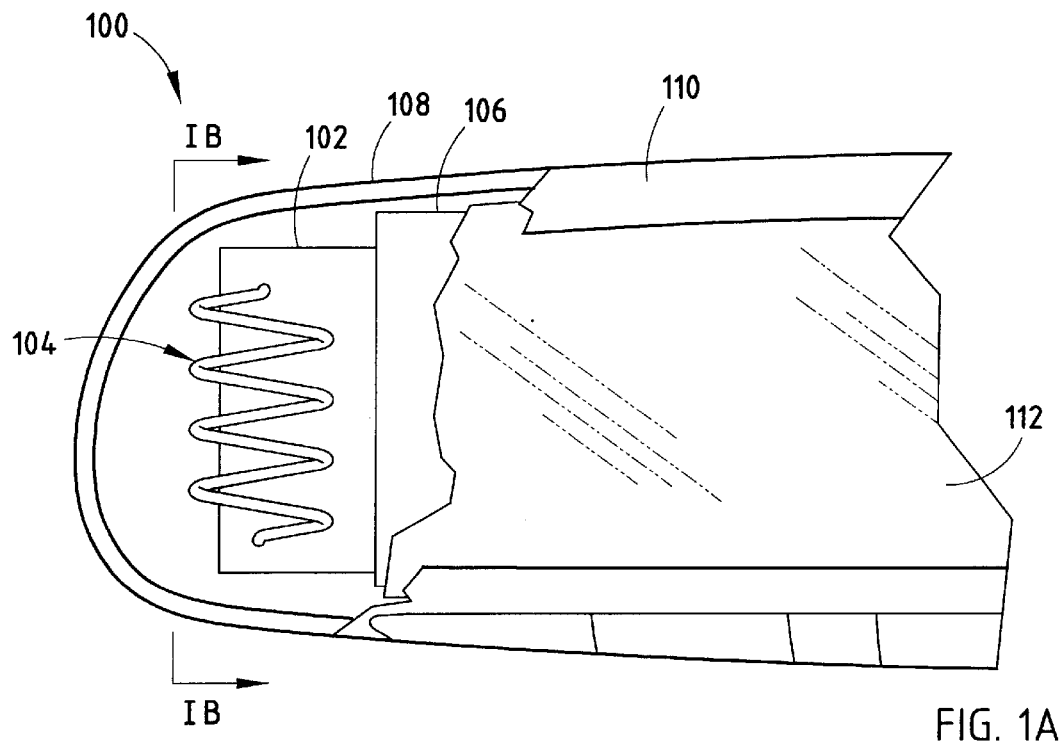
FIG. 1A is a partial front view of an exemplary automotive mirror including a helical antenna with a substantially non-circular cross-section, according to an embodiment of the present invention.

According to an embodiment of the present invention, a helical antenna is optimized for use in close proximity to an electrochromic (EC) mirror element. The helical antenna has a substantially non-circular cross-section that is optimized to function as a broadband antenna, while remaining small enough in size to be contained on a receiver daughterboard within a housing of an automotive mirror. Preferably, the helical antenna has a substantially rectangular, oval or elliptical cross-sectional area, which is generally effective for receiving signals from transmitters that are rotating, i.e., signals with time varying polarization, such as from tire pressure transmitters mounted in a vehicle wheel. It should be appreciated that while antenna polarization is not generally optimal, the use of a helical antenna with a substantially non-circular cross-section does not generally suffer from a transmission null, due to cross-polarization between a receiver and a transmitter. In a preferred embodiment, the cross-section of the helical antenna is substantially approximated by an oval.

Because the EC mirror element contains two or more highly conductive layers, which influence the impedance of any antenna in close proximity, it is desirable to position any antenna to minimize the effect on the antenna impedance. At the same time, it is desirable to locate the antenna on a receiver printed circuit board (PCB) (i.e., a receiver daughterboard), which is attached to a main PCB at a rear surface of the EC mirror element. It should be appreciated that when the EC mirror element is allowed to touch the antenna, slight variations in mirror assembly may cause large variations in antenna impedance, making impedance matching between the antenna and a receiver front-end unrepeatable. That is, placing the helical antenna in close proximity to the EC mirror element may shift the minimum voltage standing wave ratio (VSWR) point by one-hundred to two-hundred MHz.

By sizing a helical antenna such that a gap of approximately one-half to three millimeters is maintained between the antenna and a rear conductive layer of an EC mirror element, variations in the location of the EC mirror element, with respect to the antenna, generally become insignificant. According to the present invention, the number of turns of the helical antenna are adjusted to obtain a lowest VSWR at a desired operating frequency, when installed within the automotive mirror assembly. According to another embodiment of the present invention, the helical antenna is matched to a front-end of a receiver with a two element matching network.

Implementing a helical antenna with a substantially non-circular cross-section provides better sensitivity and repeatability than approaches that have utilized a layer of the EC mirror element as an antenna. It should be appreciated that an EC mirror element does not function well as an antenna when a PCB (i.e., the main PCB) with a large ground plane area is placed immediately behind the EC mirror element. However, such PCBs are typically necessary in high feature mirrors, which generally require multi-layer PCBs. According to the present invention, a helical antenna with a substantially non-circular cross-section provides antenna characteristics that are relatively independent of a vehicle wiring harness. Further, such a helical antenna can be assembled as an ordinary component on a receiver daughterboard as critical antenna alignment techniques and/or wire routing considerations are not typically required. Implementing a helical antenna with a substantially non-circular cross-section allows more of the available space within the mirror housing to be utilized to provide a larger antenna with a higher gain. In addition, as previously mentioned, when a one-half to three millimeter gap is provided between the helical antenna and a rear conductive layer of the EC mirror element, slight variations in installation of the EC mirror element in the housing of the mirror result in minimal variations in the impedance of the helical antenna.

FIG. 1A shows a partial front view of a rearview mirror assembly 100 that includes a bezel 110 that retains an EC mirror element 112 that is electrically coupled to a main printed circuit board (PCB) 106, which is electrically coupled to a receiver daughterboard 102. As shown, a helical antenna 104 with a substantially non-circular cross-section is mounted directly to the receiver daughterboard 102. The helical antenna 104 may be wound in a counterclockwise or clockwise direction. It should be appreciated that the EC mirror element 112 can be replaced with a conventional (i.e., non-electrochromic mirror element) mirror element. In this case, it is desirable to maintain a minimal gap between a rear reflective surface of the conventional mirror element and the antenna 104 as the reflective surface is generally conductive.

Figure 1B:
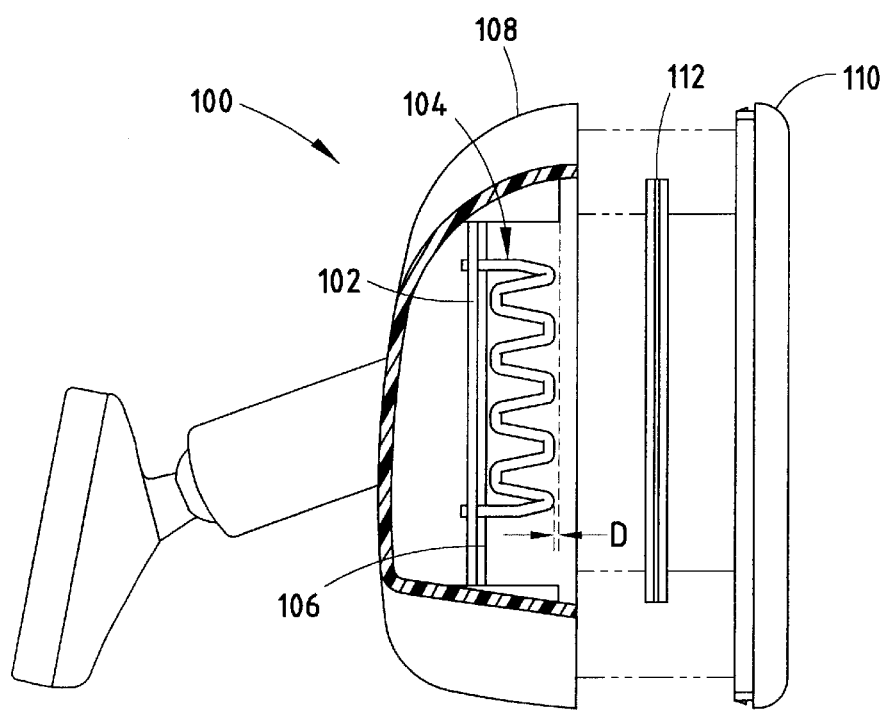
FIG. 1B is a partially exploded side view of the mirror of FIG. 1A, cross-sectioned along the line IB—IB.

FIG. 1B shows the mirror assembly 100 partially exploded and cross-sectioned, along the line IB—IB. According to a preferred embodiment, when the EC mirror element 112 is installed into housing 108, a gap 'D' is maintained between a rear surface of the EC mirror element 112 and the helical antenna 104. As previously mentioned, a minimal gap is desirable such that the antenna impedance is substantially maintained at a selected value and, thus, a matching network that matches the antenna 104 to a receiver front-end (not shown) continues to provide an appropriate matching impedance. As previously mentioned, this is desirable in that slight variations in the location of the EC mirror element 112, during manufacturing, can otherwise significantly alter the antenna 104 impedance and, thus, adversely affect the operation of the receiver. It should be appreciated that when a third surface reflector is implemented within the EC mirror element 112, depending on the thickness of a rear element of the EC mirror element 112, the antenna 104 may be in closer proximity to a rear surface of the EC mirror element 112 as a reflective conductive layer is not present on the rear surface of the EC mirror element 112.

Figure 2A:
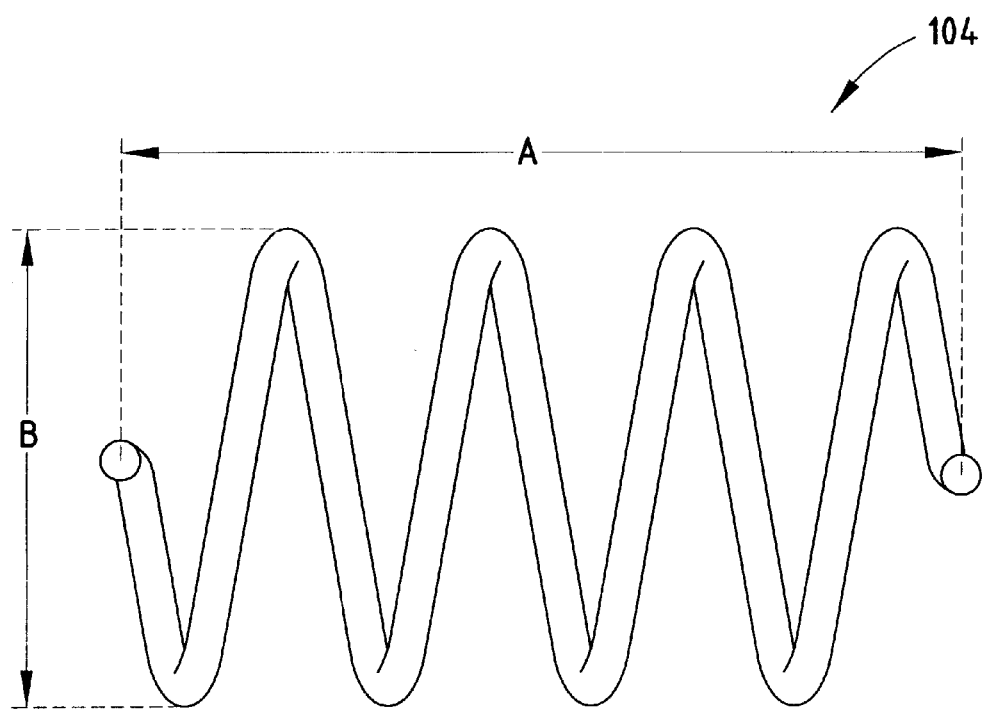
FIG. 2A is a bottom view of the helical antenna of FIG. 1A.
Figure 2B:
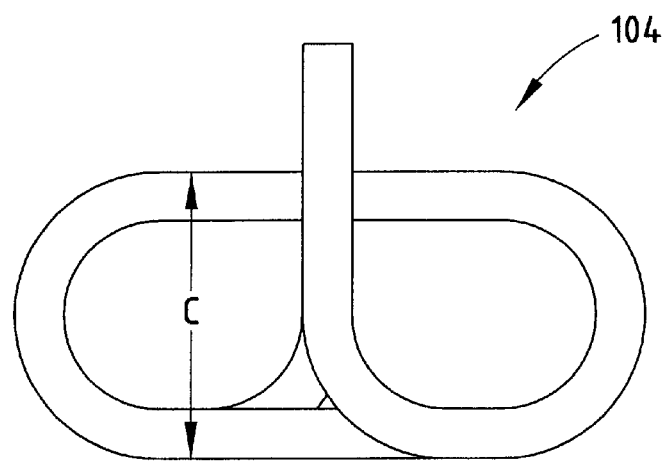
FIG. 2B is an end view of the helical antenna of FIG. 1A.
Figure 3:
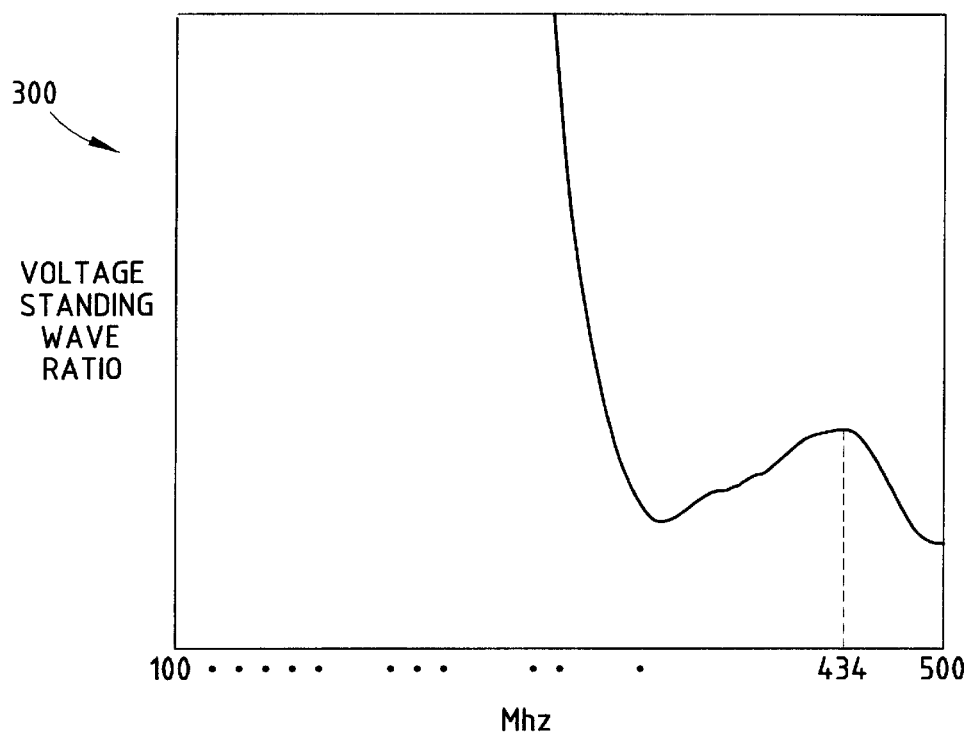
FIG. 3 is a plot of a voltage standing wave ratio (VSWR) for the antenna of FIG. 1A.

The number of turns in the helical antenna are preferably adjusted to obtain a lowest voltage standing wave ratio (VSWR) at a desired operating frequency. For a desired operating frequency of about 433 MHz, a VSWR of about 4.3776 was achieved for a three turn antenna having the dimensions 'A', 'B' and 'C' shown in FIGS. 2A–2B. In a preferred embodiment, the dimensions 'A', 'B' and 'C' are 35 mm, 20 mm and 9 mm, respectively. It should be appreciated that the dimensions of the helical antenna can be varied, limited by the available space within the housing 108, providing that a minimal gap (of at least about one-half millimeter) is maintained between the helical antenna and a rear conductive layer of the EC mirror element 112.

Figure 4:
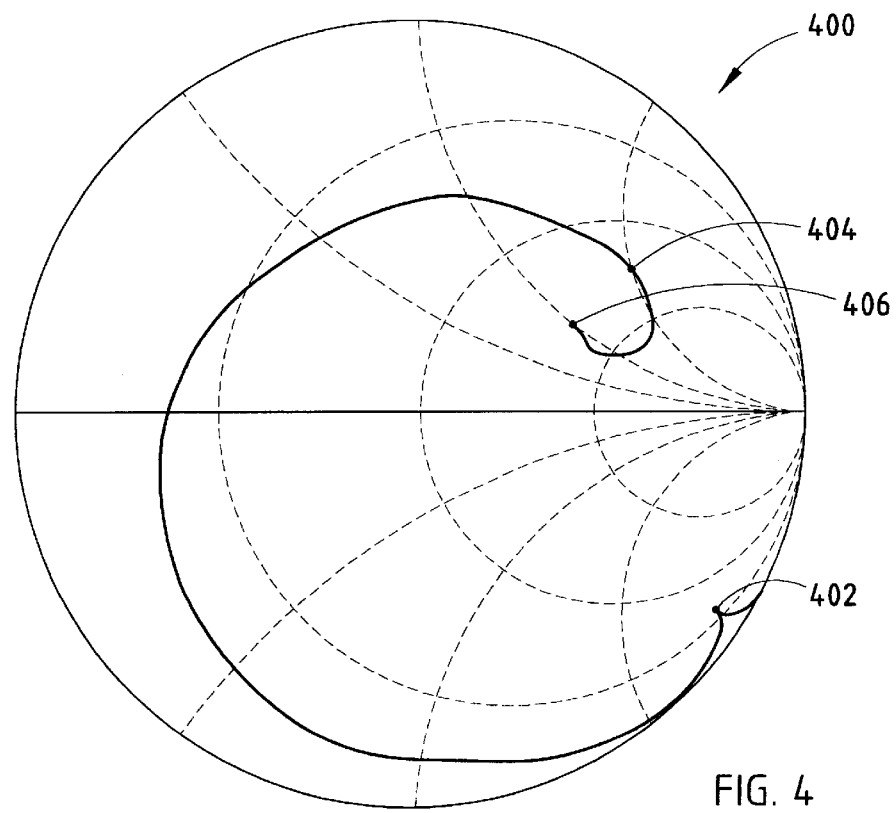
FIG. 4 is a Smith chart for the antenna of FIG. 1A.
Figure 5A:
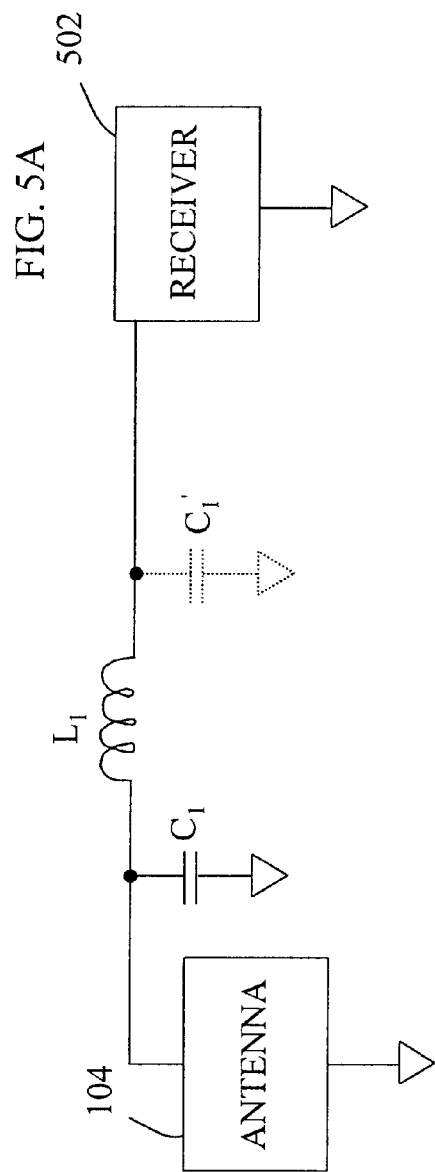
FIG. 5A is an electrical schematic of a matching network for the antenna of FIG. 1A, according to an embodiment of the present invention.

In a preferred embodiment, a wire with a circular diameter of 0.159 inches is utilized to form the antenna 104. The helical antenna 104 is preferably manufactured by wrapping the wire around a mandrel with tapered shoulders, a height of approximately 9 millimeters and a width of approximately 20 millimeters. As mentioned above, the length of the antenna is preferably about 35 millimeters. FIG. 4 depicts a Smith chart which graphs the impedance of the antenna 104, as described above, as the frequency of a transmitted signal is varied from 100 MHz (at point 402) to 500 MHz (at point 406). At about 433.92 MHz (at point 404), the antenna of FIG. 1A has an impedance of about 83.211 ohms resistive and about 98.395 ohms reactive. A matching inductor L1 with a value of about 27 nH and a matching capacitor C1 with a value of about 1.2 pF are preferably utilized to match a receiver front-end that has an input impedance of 50 ohms, when an LC matching network, as is shown in FIG. 5A, is utilized.

Figure 5B:
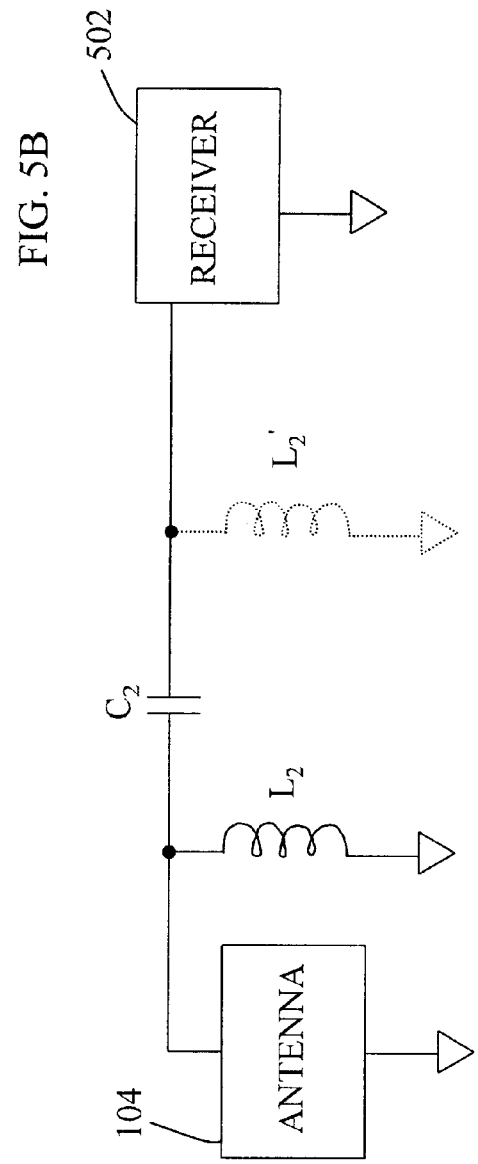
FIG. 5B is an electrical schematic of a matching network for the antenna of FIG. 1A, according to another embodiment of the present invention.

Depending upon the application, the matching network can either be an LC network (see FIG. 5A) or a CL network (see FIG. 5B), where the first component is a series component and the second component is the parallel component. In this manner, the helical antenna 104 is tuned to have a low VSWR when it is in close proximity to the EC mirror element 112, as opposed to being tuned in free space. As previously mentioned, the EC mirror element 112 has a large detuning effect on the helical antenna 104 due to the fact that the EC mirror element 112 includes large conductive plates. Turning to FIG. 5B, a matching inductor L2 has a value of about 100 nH and a matching capacitor C2 has a value of about 47 pF when a CL matching network is utilized to match a receiver front-end with an input impedance of 50 ohms. It should be appreciated that depending upon the impedance of the antenna 104 the shunt element may be moved from the antenna side to the receiver front-end side as shown by dashed component $C_1'$ (FIG. 5A) and dashed component $L_1'$ (FIG. 5B). Alternatively, a pi or other matching network may be utilized to match the antenna 104 to the receiver front-end.

Figure 6:
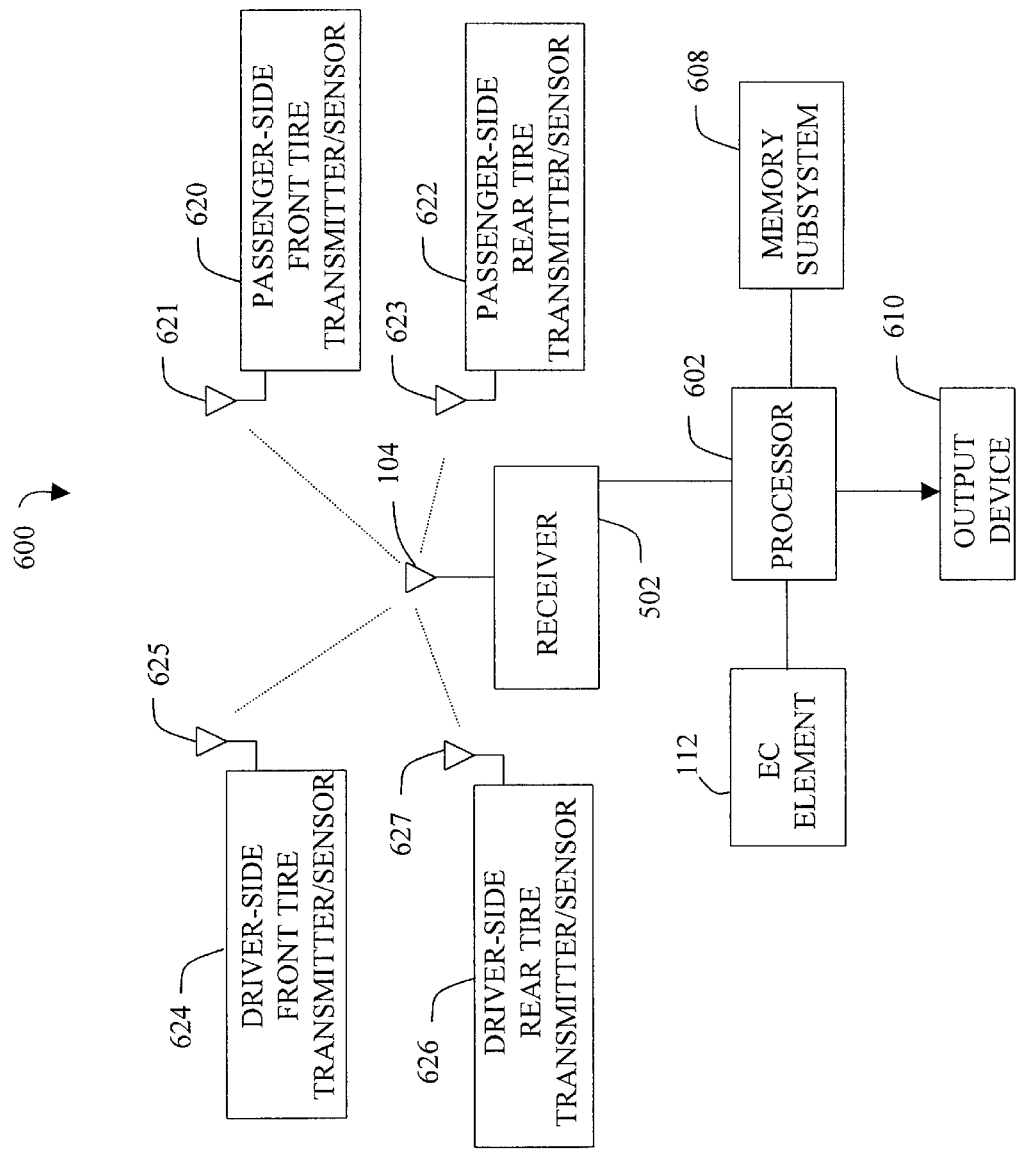
FIG. 6 is an electrical schematic, in block diagram form, of a tire monitoring (TM) system, according to an embodiment of the present invention.

Turning to FIG. 6, an exemplary tire monitoring (TM) system 600, incorporating various embodiments of the present invention, is shown. The TM system 600 includes a processor 602 that executes various routines, stored within a memory subsystem 608, to process messages received through the antenna 104, which is coupled to receiver 502. The memory subsystem 608 includes an application appropriate amount of volatile memory (e.g., static random access memory (SRAM)) and non-volatile memory (e.g., electrically erasable programmable read-only memory (EEPROM)) for storing information and executable code for receiving and displaying various information.

A transmitter/sensor 620, 622, 624 and 626, located within each vehicle tire, periodically transmits a message (including, for example, a unique identification (ID) code and a tire pressure) to the receiver 502 through an antenna 621, 623, 625 and 627, respectively. A sensor located within each transmitter/sensor 620, 622, 624 and 626 can be of a wide variety of sensors or a combination of sensors. Preferably, each sensor includes a pressure sensor and a temperature sensor, which can be utilized to determine if a tire has overheated. The temperature sensor can also generally be utilized to distinguish a front tire of a front-wheel drive vehicle in that the front tires of a front-wheel drive vehicle are typically warmer than the rear tires of a front-wheel drive vehicle. When a low pressure tire (e.g., a flat tire) is detected, the processor 602 preferably causes an audible and/or visual indication to be provided, via an output device 610. When the output device 610 includes a display, the display can be located within a mirror assembly or in another location within the vehicle. As mentioned above, the display preferably provides an ID code and tire pressure to a driver of the vehicle. An example of a suitable tire pressure monitoring system is disclosed in commonly assigned U.S. Pat. No. 6,215,389, the entire disclosure of which is incorporated herein by reference.

Accordingly, a helical antenna with a substantially non-circular cross-section has been described herein. The antenna is capable of fitting in a limited space and provides adequate gain to receive signals from, for example, transmitters that are rotating.

The above description is considered that of the preferred embodiments only. Modification of the invention will occur to those skilled in the art and to those who make or use the invention. Therefore, it is understood that the embodiments shown in the drawings and described above are merely for illustrative purposes and not intended to limit the scope of the invention, which is defined by the following claims as interpreted according to the principles of patent law, including the Doctrine of Equivalents.

What is claimed is:

1. An automotive rearview mirror assembly, comprising:
   a mirror element;
   a housing for accepting and retaining the mirror element; and
   a receiver circuit mounted on a printed circuit board (PCB) contained within the housing, the receiver circuit including a helical antenna with a substantially non-circular cross-section.

2. The mirror assembly of claim 1, wherein the non-circular cross-section is substantially one of a rectangular, an oval and an elliptical cross-section.

3. The mirror assembly of claim 1, wherein the mirror element is an electrochromic mirror element.

4. The mirror assembly of claim 3, further including:
   a control circuit contained within the housing, the control circuit controlling the attenuation of light passing into a chamber of the electrochromic mirror element based on surrounding light levels.

5. The mirror assembly of claim 3, wherein the helical antenna is located between the PCB and a rear element of the electrochromic mirror element.

6. The mirror assembly of claim 1, wherein the receiver circuit is configured to receive messages from a plurality of transmitters each located within a tire of a vehicle.

7. The mirror assembly of claim 1, wherein an impedance of the helical antenna is matched to an impedance of a front-end of the receiver circuit with a two electrical element network.

8. The mirror assembly of claim 3, wherein a gap between a rear conductive layer of the electrochromic mirror element and the helical antenna is in a range of about one-half to three millimeters.

9. The mirror assembly of claim 3, wherein a gap between a rear conductive layer of the electrochromic mirror element and the helical antenna is about one-half millimeter.

10. The mirror assembly of claim 1, wherein the helical antenna is located between the PCB and a rear surface of the mirror element.

11. The mirror assembly of claim 1, wherein a gap between a rear conductive layer of the mirror element and the helical antenna is in a range of about one-half to three millimeters.

12. The mirror assembly of claim 1, wherein a gap between a rear conductive layer of the mirror element and the helical antenna is about one-half millimeter.

13. An automotive rearview mirror assembly, comprising:
    an electrochromic mirror element;
    a housing for accepting and retaining the electrochromic mirror element;
    a receiver circuit mounted on a printed circuit board (PCB) contained within the housing, the receiver circuit including a helical antenna with a substantially non-circular cross-section; and
    a control circuit contained within the housing, the control circuit controlling the attenuation of light passing into a chamber of the electrochromic mirror element based on surrounding light levels.

14. The mirror assembly of claim 13, wherein the non-circular cross-section is substantially one of a rectangular, an oval and an elliptical cross-section.

15. The mirror assembly of claim 13, wherein the helical antenna is located between the PCB and a rear conductive layer of the electrochromic mirror element.

16. The mirror assembly of claim 13, wherein the receiver circuit is configured to receive messages from a plurality of transmitters each located within a tire of a vehicle.

17. The mirror assembly of claim 13, wherein an impedance of the helical antenna is matched to an impedance of a front-end of the receiver circuit with a two element network.

18. The mirror assembly of claim 13, wherein a gap between a rear conductive layer of the electrochromic mirror element and the helical antenna is in a range of about one-half to three millimeters.

19. The mirror assembly of claim 13, wherein a gap between a rear conductive layer of the electrochromic mirror element and the helical antenna is about one-half millimeter.

20. An automotive rearview mirror assembly, comprising:
    an electrochromic mirror element;
    a housing for accepting and retaining the electrochromic mirror element;
    a receiver circuit mounted on a printed circuit board (PCB) contained within the housing, the receiver circuit including a helical antenna with a substantially non-circular cross-section; and
    a control circuit contained within the housing, the control circuit controlling the attenuation of light passing into the chamber of the electrochromic mirror element based on surrounding light levels, wherein the helical antenna is located between the PCB and a rear surface of the electrochromic mirror element, and wherein a gap between a rear conductive layer of the electrochromic mirror element and the helical antenna is in a range of about one-half to three millimeters.

21. The mirror assembly of claim 20, wherein the non-circular cross-section is substantially one of a rectangular, an oval and an elliptical cross-section.

22. The mirror assembly of claim 20, wherein the receiver circuit is configured to receive messages from a plurality of transmitters each located within a tire of a vehicle.

23. The mirror assembly of claim 20, wherein an impedance of the helical antenna is matched to an impedance of a front-end of the receiver circuit with a two element network.

24. The mirror assembly of claim 20, wherein a gap between the rear conductive layer of the electrochromic mirror element and the helical antenna is about one-half millimeter.

25. A tire monitoring system, comprising:
    a plurality of sensors each located in a different one of a plurality of vehicle tires;
    a plurality of transmitters each associated with a respective one of the sensors, wherein each of the transmitters is configured to transmit a unique transmitter identification code for the vehicle tire in which it is located; and an automotive rearview mirror assembly, including:
  an electrochromic mirror element;
  a housing for accepting and retaining the electrochromic mirror element;
  a receiver circuit mounted on a printed circuit board (PCB) contained within the housing, the receiver circuit including a helical antenna with a substantially non-circular cross section; and
  a control circuit contained within the housing, the control circuit controlling the attenuation of light passing into a chamber of the electrochromic mirror element based on surrounding light levels, wherein the helical antenna is located between the PCB and a rear surface of the electrochromic mirror element, and wherein a gap between a rear conductive layer of the electrochromic mirror element and the helical antenna is in a range of about one-half to three millimeters.

26. The system of claim 25, wherein the non-circular cross-section is substantially one of a rectangular, an oval and an elliptical cross-section.

27. The system of claim 25, wherein the receiver circuit is configured to receive messages from a plurality of transmitters each located within a tire of a vehicle.

28. The system of claim 25, wherein an impedance of the helical antenna is matched to an impedance of a front-end of the receiver circuit with a two element network.

29. The system of claim 25, wherein a gap between the rear conductive layer of the electrochromic mirror element and the helical antenna is about one-half millimeter.

* * * * *